US006476831B1

(12) United States Patent
Wirth et al.

(10) Patent No.: US 6,476,831 B1
(45) Date of Patent: Nov. 5, 2002

(54) VISUAL SCROLLING FEEDBACK AND METHOD OF ACHIEVING THE SAME

(75) Inventors: Michael Clarence Wirth, Palo Alto; Shumin Zhai, San Jose, both of CA (US)

(73) Assignee: International Business Machine Corporation, Armonk, NY (US)

(*) Notice: Subject to any disclaimer, the term of this patent is extended or adjusted under 35 U.S.C. 154(b) by 0 days.

(21) Appl. No.: 09/502,980

(22) Filed: Feb. 11, 2000

(51) Int. Cl.$^7$ .................................................. G09G 5/34
(52) U.S. Cl. ..................... 345/784; 345/592; 345/629; 345/973; 345/588; 707/528
(58) Field of Search .............................. 345/784–787, 345/973, 864, 588, 589, 592, 598, 629, 671, 684–688; 707/526, 528

(56) References Cited

U.S. PATENT DOCUMENTS

| 5,404,316 | A |   | 4/1995  | Klingler et al. ............. 364/514 |
| 5,530,455 | A |   | 6/1996  | Gillick et al. ............... 345/163 |
| 5,532,715 | A |   | 7/1996  | Bates et al. .................. 345/123 |
| 5,696,982 | A | * | 12/1997 | Tanigawa et al. ............ 345/1.1  |
| 5,739,817 | A |   | 4/1998  | Glei et al. ................... 345/341 |
| 5,828,374 | A |   | 10/1998 | Coleman et al. ............. 345/341 |
| 5,852,440 | A |   | 12/1998 | Grossman et al. .......... 345/348 |
| 5,859,638 | A |   | 1/1999  | Coleman et al. ............. 345/341 |
| 5,900,872 | A |   | 5/1999  | Ashe .......................... 345/339 |
| 6,300,967 | B1 | * | 10/2001 | Wagner et al. ............... 345/784 |
| 6,384,840 | B1 | * | 5/2002  | Frank et al. ................. 345/629 |

OTHER PUBLICATIONS

Zhai, S., Smith, B.A., Selker, T., "Improving Browsing Performance: A Study of Four Input Devices for Scrolling and Pointing Tasks," Proceedings of INTERACT: the Sixth IFIP conference on Human Computer Interaction, pp. 286–292 (1997).

Bury, K.F., Boyle, J.M., Evey, R.J., and Neal, A.S., 1982, "Windowing vs Scrolling on a Visual Display Terminal", Proceedings of Conference on Human Factors in Computer Systems, pp. 41–44 (1982).

Bier, E. A., M. C. Stone, Buxton, W., Baudel, T., "A Taxonomy of See–Through Tools," CHI '94 Conference Proceedings, pp. 358–364 (1994).

Zhai, S., Buxton, W., Milgram, P., "The "Silk Cursor": Investigating Transparency for 3D Target Acquisition," CHI '94: Conference Proceedings (1994).

Zhai, S., Buxton, B., Milgram, P., "The Partial Occlusion Effect: Utilizing Semi–transparency in 3D Human Computer Interaction," ACM Transactions on Computer–Human Interaction 3(3), pp. 254–284 (1996).

Harrison, B. and K. Vicente, J., "An Experimental Evaluation of Transparent Menu Usage," ACM CHI 96: Human Factors in Computing Systems, pp. 391–398 (1996).

Hinckley, K., Sinclair, M., "Touch–Sensitive Input Device," CHI 99: ACM Conference in Human Factors in Computing Systems, pp. 223–230 (1999).

* cited by examiner

Primary Examiner—Kristine Kincaid
Assistant Examiner—Sajeda Muhebbullah
(74) Attorney, Agent, or Firm—Samuel A. Kassatly (57) ABSTRACT

A new technique is described which provides realtime visual feedback to the user while scrolling in standard windowing environments. This visual scrolling technique makes use of a transient overlay which provides direct visual cues to the user about the new areas of the scrolled document that have been exposed to view by the scrolling action. After a predetermined period of time or as soon as the user stops scrolling, the overlay fades from view. This feedback can substantially enhance the user's ability to maintain spatial context while the document moves, reducing error and strain, and enhancing ease of use and productivity. The visual scrolling technique can be used for both one-dimensional scrolling such as in long galleys of text, and two-dimensional scrolling and zooming such as in maps and technical drawings. It is especially useful for small displays, such as in handheld devices.

20 Claims, 11 Drawing Sheets

VISUAL SCROLLING FEEDBACK AND METHOD OF ACHIEVING THE SAME

FIELD OF THE INVENTION

The present invention relates to the field of data processing. Particularly, this invention relates to a realtime graphical overlay that provides visual scrolling feedback for a display window that offers a view into a presentation space or a viewport. The graphical feedback overlay is transient and provides direct visual guidance to the user about new areas being exposed to view by the scrolling action. The feedback overlay fades from view within a predetermined or programmable period of time, or when the scrolling action is stopped. The feedback overlay substantially enhances the user's ability to maintain spatial context while the document is being scrolled, reducing error and strain, and enhancing ease of use and productivity.

BACKGROUND OF THE INVENTION

In the early days of the personal computer, browsing a document was difficult to do. The document would often take up several screens worth of information, and it was difficult for the user to find specific sections of the document. The user would often have to scroll through an entire document one screen at a time, by pressing function keys assigned to "scroll up" and "scroll down" functions in an often futile attempt to find a specific section. This was slow and cumbersome, and resulted in many users printing the entire document instead of trying to view it on the display. This constituted a significant waste of valuable manpower and natural resources.

The advent of the "graphical user interface" (GUI) programs ushered an optimistic outlook to addressing the above problem. Scrolling the content in a GUI window is one of the most frequent tasks in interacting with today's computers. The content of the GUI window scrolled, also referred to herein as "document," can be a file directory, a word processing file, a computer program source code, a spreadsheet, a two-dimensional map or image, an engineering drawing, a world wide web page, and so forth.

Traditionally, there are three ways to scroll through a document. One is by pressing on the cursor keys in the computer board. The second is by pressing the "page up" and "page down" keys. The third is a feature of the GUI programs and is referred to as a "scroll bar". The scroll bar is commonly associated with a display window, and is most useful when only a small portion of a document can be displayed in a display window at any one time. The scroll bar contains what is known as a "slider". The slider's relative position in the scroll bar graphically indicates the position of the display window relative to the entire document being displayed. One scroll bar is often used to indicate the relative vertical position, while another scroll bar can be used to indicate the relative horizontal position.

A scroll bar is normally used in conjunction with an input device such as a mouse, track ball, or light pen. When a user wants to move to a different section of a document, he or she can either move the mouse cursor to a new position on the scroll bar (click operation), or place the mouse cursor on the slider, press and hold one of the mouse buttons, and move the mouse cursor either one side or the other of the slider (drag operation). While both of these operations are helpful in rapidly moving from one section of a document to another section, they do not sufficiently help the user to find the specific section of the document he or she is looking for.

A standard technique often used in representing scroll bars is to make the slider on the scroll bar of proportional length, representing the portion of the full document which is in view. This places the viewed section in context with respect to the entire document, but does not directly relate to the newly exposed document portion after a scrolling action. If the document is very large relative to the portion currently being viewed in the window (e.g., as in a very long galley of text, or at high magnification of a two-dimensional image), the size of the slider becomes too small to interpret or use.

Another technique is described in U.S. Pat. No. 5,532,715 to Bates et al., titled "Visually Aging Scroll Bar", where a visually aging scroll bar is associated with a window or viewport on a computer display, and contains a slider to indicate relative positioning in the window of a document. After a first predetermined sampling period has elapsed, a first region matching the current position of the scroll bar slider is created. The visual appearance of the region is determined by a predetermined region heating rate. For example, a newly created region starts at "cold", which can be indicated by a violet-indigo color. After a second sampling period has elapsed, the computer system again checks the current position of the scroll bar slider. If the current position still matches the first region, the visual appearance of the first region symbolically "warms up" as indicated by the region heating rate. This incrementally changing visual appearance continues for as long as the current slider position matches the first region, up until a maximum region symbolic "temperature" is reached.

Some techniques adopt an input device that offers a dedicated scrolling mechanism to enhance the operation of the scroll bar, by making it easier for a user to find a specific section he or she is looking. One such scrolling mechanism is the ScrollPoint® stick which is incorporated in the IBM ScrollPoint® mouse. Another mechanism is a scroll wheel described in U.S. Pat. No. 5,530,455 to Gillick et al. and titled "Roller Mouse for Implementing Scrolling in Windows Applications". Another scrolling mechanism is IBM's TrackPoint® that includes a button, which, when pressed, enables scrolling in IBM's Thinkpad® TrackPoint® notebook computers. Yet another mechanism is the touchpad where scroll areas are used for examples in notebook and keyboards.

The relative input control performance of the above scrolling mechanisms has been studied in Zhai, S., Smith, B. A., Selker, T., "Improving Browsing Performance: A Study of Four Input Devices for Scrolling and Pointing Tasks," Proceedings of INTERACT: the Sixth IFIP conference on Human Computer Interaction, pages 286–292 (1997). While these scrolling mechanisms may have realized their intended purposes, scrolling through documents is often confusing and causes a loss of context for the user, regardless of the input devices used, particularly since conventional scrolling mechanisms do not offer spatial clues or visual scrolling feedback, especially if the document consists of visually similar sections of material such as a continuous text.

For example, when using a page up or page down key, many applications scroll by one window length of document, so that the user can expect where the last read sentence should appear after the operation. A common frustrating experience with page keys, however, occurs when the user reaches the end of the document, where the remaining document is arbitrary in relation to a window's length which depends on the user's setting and resizing. The remaining document is scrolled into the window, but the user has to search through the document to locate the last read sentence.

The lack of visual scrolling feedback is evident in both one-dimension, such as when scrolling through long galleys of material (i.e., web pages), and in two-dimensions, such as when panning or zooming through maps and engineering drawings. It is aggravated on small-display devices, such as handheld devices, where loss of context requires extensive mental effort, eye motion and time to re-acquire the context, reducing productivity and increasing the user's strain and fatigue level.

In most conventional GUI software applications "windowing" occurs when the user's physical scrolling action causes the viewing window to "move" in the same direction. However, the viewing window does not actually move in relation to the computer physical monitor or the user's body. What moves is the document although in the opposite direction to the user's input. Reference is made to Bury, K. F., Boyle, J. M., Evey, R. J., and Neal, A. S., 1982, "Windowing vs Scrolling on a Visual Display Terminal", Proceedings of Conference on Human Factors in Computer Systems, pages 41–44 (1982).

Another scrolling input technique which is more direct in perception-motor correspondence is the "grabber hand," according to which a pointing cursor is transformed into a hand symbol that "grabs" the underlying document. Moving the cursor drags the document in direct correspondence to the movement of the cursor. Though this motion is intuitive, scrolling is limited to movements that are a fraction of a screen size, and it becomes tedious if a large, multi-screen movement is desired. It also cannot be used for smooth, continuous scrolling.

Certain applications, such as the Lotus Notes™ client application uses a "tic" mark in the margin to mark the boundary of the newly exposed text when scrolling documents. This approach requires eye motion to find the mark and then to use the mark to re-acquire the reader's position in the text. Other software applications, such as Microsoft® Word™, displays a box of text with the page number and headings of the document when the user clicks and drag the slider in the scrollbar. While this may provide useful information, the information is not directly integrated with the context of the document. The granularity of the information feedback is also low as it is limited to page numbers and headings, and does not provide the user with a direct and continuous visual feedback that overlays the scrolled image and that corresponds exactly to the scrolling action.

Other graphic applications show a thumbnail view of the page being, which is effectively a two-dimensional version of proportional scrollbars. While this technique helps with two-dimensional scrolling, it is not very useful where the visual landmarks in the document disappear at the scale of the thumbnail image, or where the aspect ratio of the document is large (i.e., much longer than wide).

One GUI application uses semi-transparent graphics as a user interface, and is described for example in the following publications: Bier, E. A., M. C. Stone, Buxton, W., Baudel, T., "A Taxonomy of See-Through Tools," CHI '94 Conference Proceedings, pages 358–364 (1994); Zhai, S., Buxton, W., Milgram, P., "The "Silk Cursor": Investigating Transparency for 3D Target Acquisition," CHI '94: Conference Proceedings (1994); Zhai, S., Buxton, B., Milgram, P., "The Partial Occlusion Effect: Utilizing Semi-transparency in 3D Human Computer Interaction," ACM Transactions on Computer-Human Interaction 3(3), pages 254–284 (1996); Harrison, B. and K. Vicente, J., "An Experimental Evaluation of Transparent Menu Usage," ACM CHI 96: Human Factors in Computing Systems, pages 391–398 (1996); and Hinckley, K., Sinclair, M., "Touch-Sensitive Input Device," CHI 99: ACM Conference in Human Factors in Computing Systems, pages 223–230 (1999).

However, none of these references directly associates a transient semi-transparent visual feedback layer with the scrolling action in a display window, for providing direct visual guidance to the user about new areas being exposed to view, such that the feedback layer fades from view so that it does not affect the legibility or permanent appearance of the source image.

SUMMARY OF THE INVENTION

In accordance with the present invention, a software package is provided as a new technique that provides realtime visual feedback to the user while scrolling in windowing environments. This technique is accomplished by a transient overlay that provides direct visual cues or guidance to the user about the new areas of the scrolled document that have been exposed to view by the scrolling action. After a predetermined period of time such as a fraction of a second, or as soon as the user stops scrolling, the overlay fades from view. This feedback substantially enhances the user's ability to maintain spatial context while the document moves, reducing error and strain, and enhancing ease of use and productivity.

One feature of the present visual scrolling feedback technique is its ability to be used for both one-dimensional scrolling documents such as long galleys of text, and multi-dimensional scrolling, panning, and zooming out of documents such as maps and technical drawings. The visual scrolling feedback technique is well suited for two dimensional scrolling and at arbitrary angles other than horizontal or vertical, and is particularly suited for small displays such as handheld devices.

The technique of the present invention provides the user with temporary visual feedback in a form which is not distracting, which is directly embedded in the document itself, which does not obscure the source material, and which conforms to an intuitively understood and adapted physical process, thus requiring no prior training. As the user moves the document through the GUI window, by for example scrolling, panning or zooming, the newly exposed portions "develop" or are transformed from a muted state (e.g., lower contrast, painted with semi-transparent overlay color or pattern, or distinguished by some image transformation such as a shift in hue or color balance) to a normal contrast and brightness state in a second or two after the user stops scrolling. Many combinations of overlay color, pattern and image transformations are possible, depending on the nature of the document being viewed.

As new pointing and scroll control devices are becoming available, the user's ability to smoothly scroll at high speed may exceed his or her ability to maintain visual context. The present visual scrolling feedback technique reduces the user's effort significantly, and improves the user's scrolling speed without losing position context. Some important aspects of the present technique include:

Superimposing graphical overlay information, represented by a visual feedback layer on a document, helps the user track scrolling movement. The graphical information is transient, and fades away after the user stops scrolling. The graphical overlay information can be an outline or semi-transparent by means of standard image combination ("compositing") techniques with the base document, such as alpha-blending, or image multiplication.

The graphical overlay information may include a periodic, spatially-repetitive pattern or color. The period of the pattern can be selected to perform various functions: to the size of the window to convey how far the user has scrolled by the number of pattern cells that have passed; to a size appropriate to the document, e.g., to a page size for text documents; or to a scale appropriate to the underlying data, e.g., to a map scale.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

Figure 1:
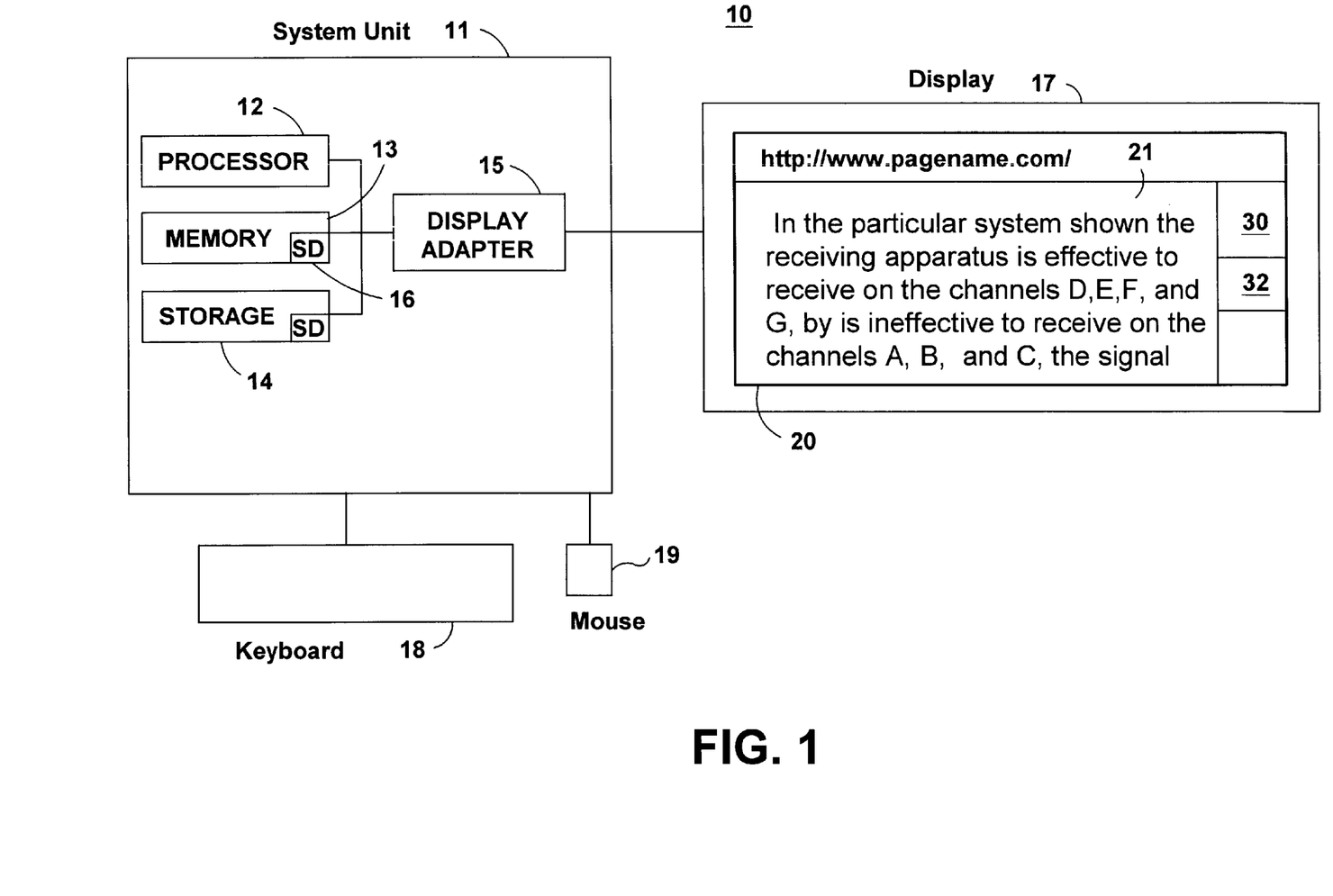
FIG. 1 is a high-level block diagram of a computer system that provides visual scrolling feedback according to the present invention.

FIG. 1 illustrates a computer system 10 capable of providing the user with visual scrolling feedback according to the present invention. The computer system 10 includes a display 17, a keyboard 18, and an input device 19, each of which is connected to a system unit 11. The system unit 11 contains a processor 12 connected to a memory 13, a storage 14, and a display adapter 15. The processor 12 is suitably programmed to carry out this invention, as described herein in more detail.

In a preferred embodiment, the computer system 10 is an IBM system such as a personal computer, a handheld computer, or a microcomputer connected to a larger computer system (e.g. IBM AS/400). The processor 12 is a microprocessor, the display adapter 15 is an IBM display adapter, and the display 17 is an IBM display. The input device 19 is preferably an IBM mouse but may also be a track ball, light pen, or another input device. The storage 14 is a magnetic hard disk file and contains the operating system software, preferably OS/2, as well as preferably one or more OS/2 application programs. When running, these application programs are partially or completely installed in the memory 13 and executed by the processor 12.

The display 17 contains a window 20. For the purposes of this invention, a "window" or "viewport" can occupy anywhere from substantially all of the display screen to a very small portion of the display screen, and may be displayed in conjunction with (possibly overlaying portions of) other windows in a multi-asking environment such as OS/2, or be by itself in a single-tasking environment such as DOS. A portion of a document 21 is displayed in the window 20. Hereinafter, the term "document" will be used to refer to any source document such as a data file, a text file, an image file, an audio file, a video file, a spreadsheet and so forth. In certain instances, the document 21 cannot be fully displayed or otherwise represented in the window 20. The window 20 also contains a scroll bar 30 with a slider 32. The relative position of the slider 32 in the scroll bar 30 indicates the relative position of the document 21 currently displayed in the window 20. For illustrative purpose, a portion of the document 21 is shown in the window 20 of FIG. 1.

Figure 2:
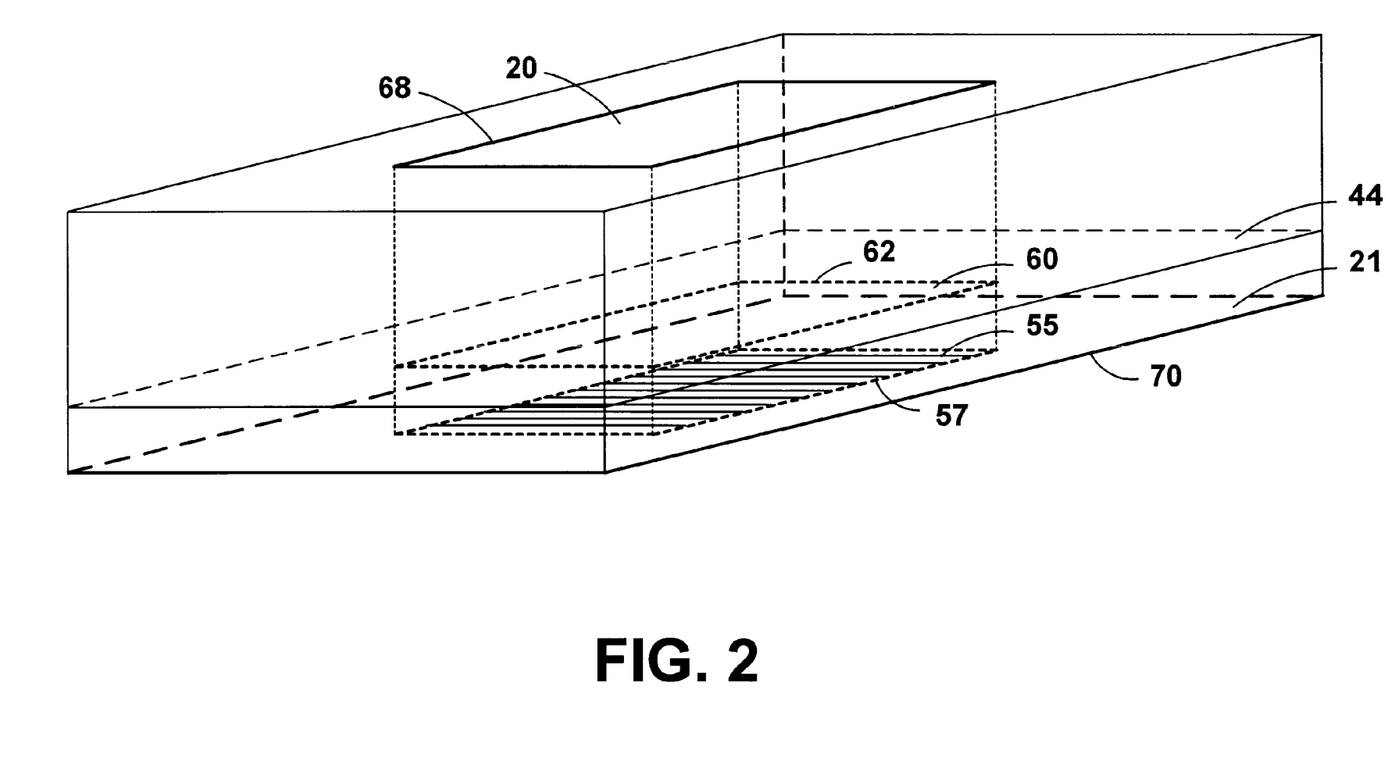
FIG. 2 is a perspective view of an exemplary implementation of the present invention, illustrating a visual graphical feedback layer which is superimposed on a document being viewed through a window for tracking the user scrolling movement.

FIG. 2 illustrates the general implementation of the present invention, wherein graphical overlay information, represented by a visual feedback layer 44, is superimposed on the document 21 for helping the user track scrolling movement.

The visual feedback layer 44 is transient and fades away after the user stops scrolling. It is preferably an outline or semi-transparent by means of standard image combination ("compositing") techniques with the base document 21, such as alpha-blending, or image multiplication.

The projection of the window (or viewport) 20 onto the document 21 represents the region 55 of the document 21 which is visible to the user. The document region 55 is cross-hatched for ease of illustration and is bounded by a peripheral contour 57. The projection of the window 20 onto the visual feedback layer 44 represents a region 60 which is visible to the user, which overlays the document region 55, and which is bounded by a peripheral contour 62. The outer contour of the window 20 is referenced by the numeral 68.

The user can control the appearance of the visual feedback layer 44 by personalizing its compositing with the document. In one embodiment, the visual feedback layer 44 is overlaid on the document 21 according to an absolute positioning feedback approach, as it will be described later in connection with FIGS. 3 through 7. In another embodiment, the visual feedback layer 44 is overlaid according to a relative positioning approach, as it will be described later in connection with FIGS. 8 and 9. The user can employ either one or both of these two approaches as desired to better suit his or her individual needs.

Figure 3:
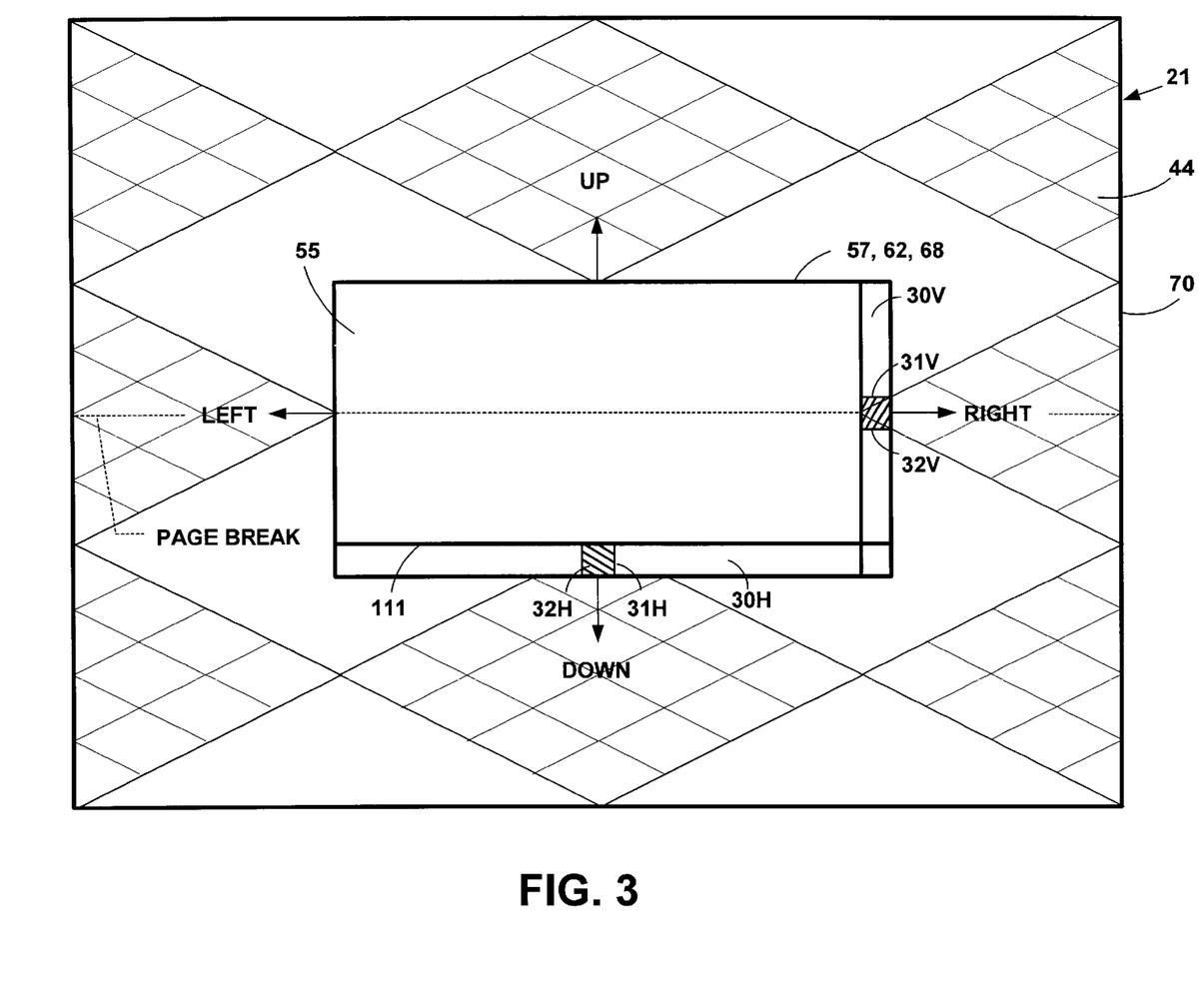
FIGS. 3, 4, 4A, and 5 are views of the exemplary implementation of FIG. 2 with the document removed for ease of illustration, illustrating an absolute positioning feedback approach of the present invention.
Figure 4:
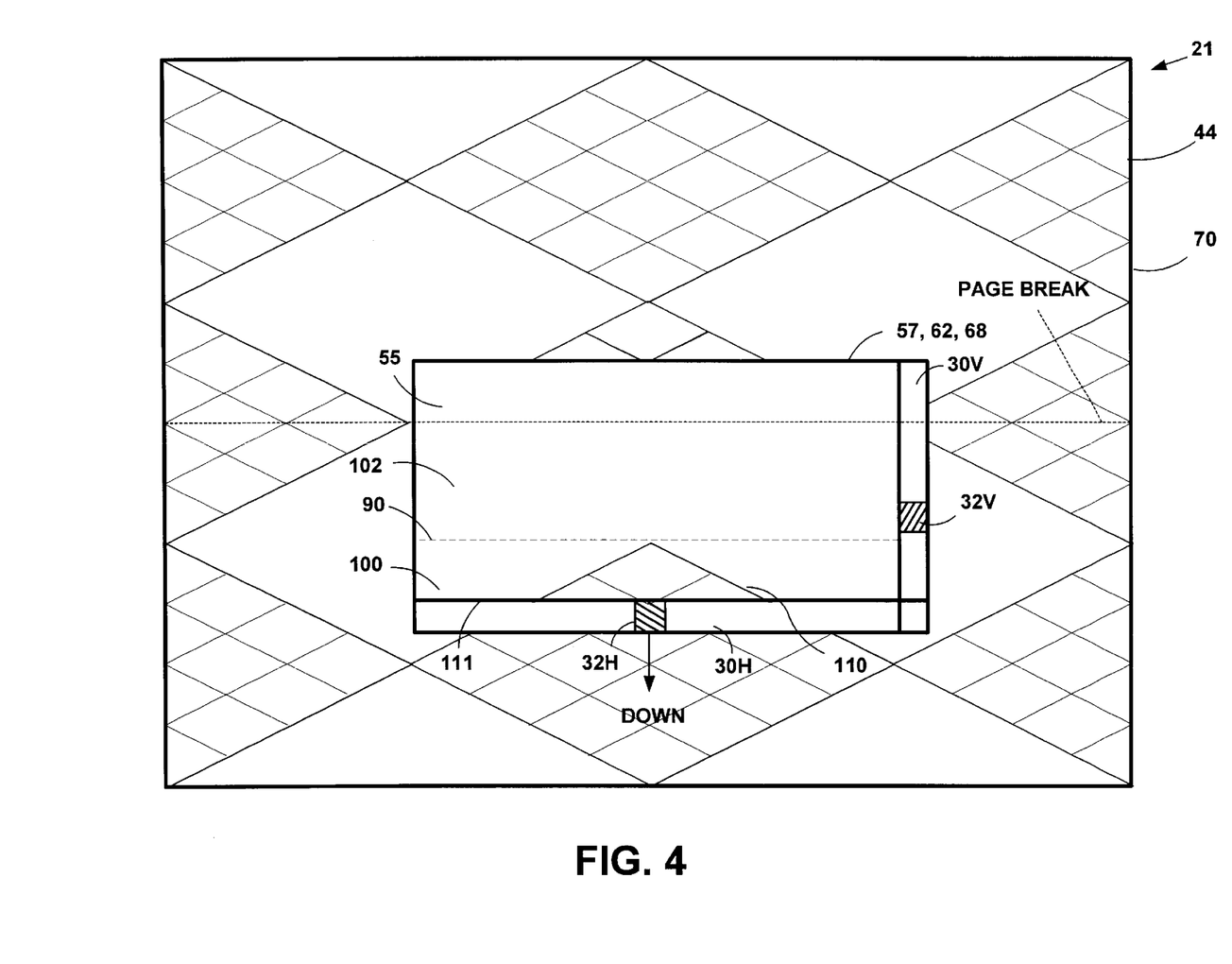
Figure 5:
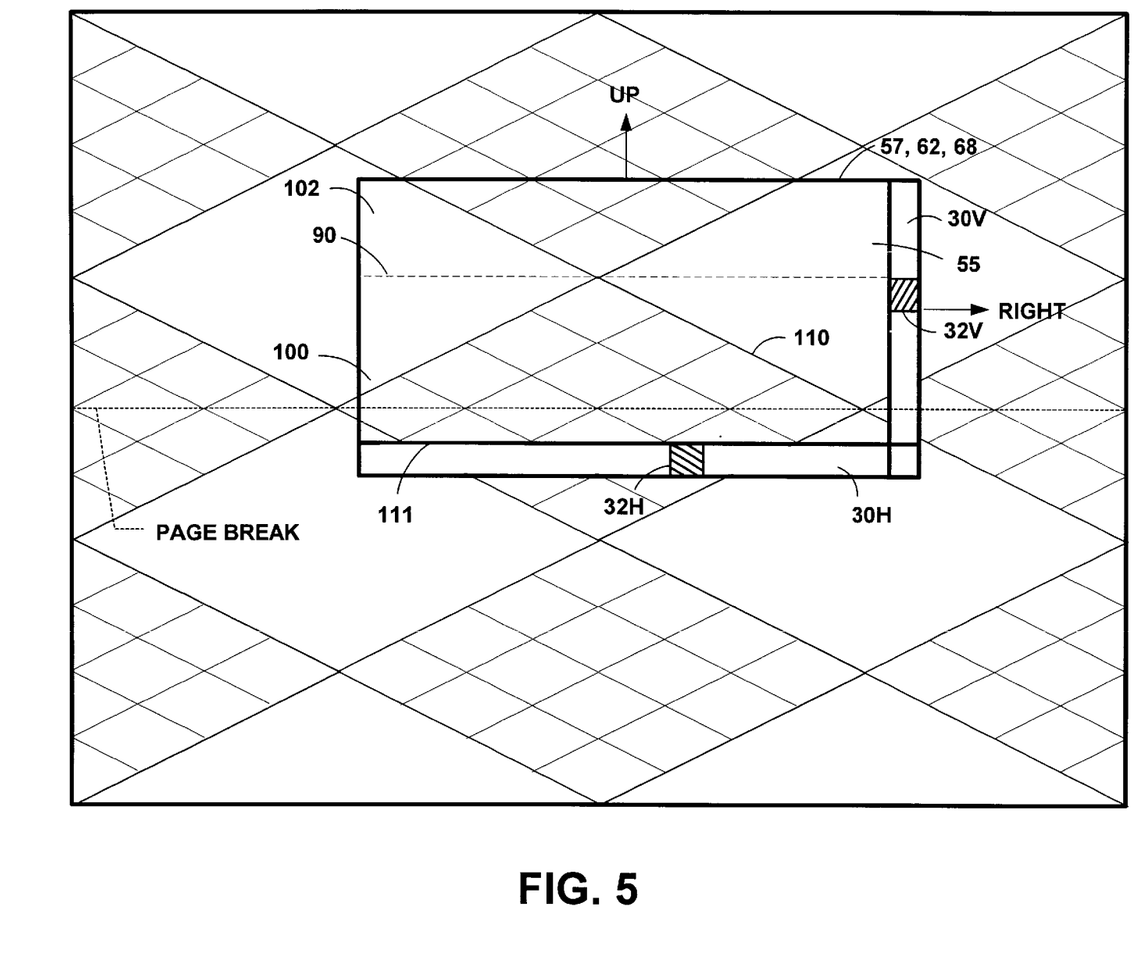

FIGS. 3–5 show how regions of the document 21 change visual appearance based on the current position of the document 21 in an absolute positioning feedback approach. The document 21 is linearly represented by a vertical scroll bar 30V and a horizontal scroll bar 30H. For example, if a user wishes to go to the middle of the document 21, he or she would move the mouse pointer to points 31V and 31H (FIG. 3) of the vertical scroll bar 30V and the horizontal scroll bar 30H, respectively.

FIGS. 3–5 also illustrate various exemplary positions of the window 20 relative to an outer boundary 70 of the document 21, and the locations of the vertical and horizontal sliders 32V, 32H, respectively. As the user views the document 21, the contours 57, 62, 68 of the document region 55, the visual feedback layer visual feedback layer 44, and the window 20, respectively, appear to coincide. As the window 20 moves such as by a scrolling movement, or its size changes such as by a zooming or panning action, the positions and sizes of the document region 55 and the visual feedback layer region 60 change accordingly, and the contours 57, 62, 68 remain in coincident relationship.

Figure 6:
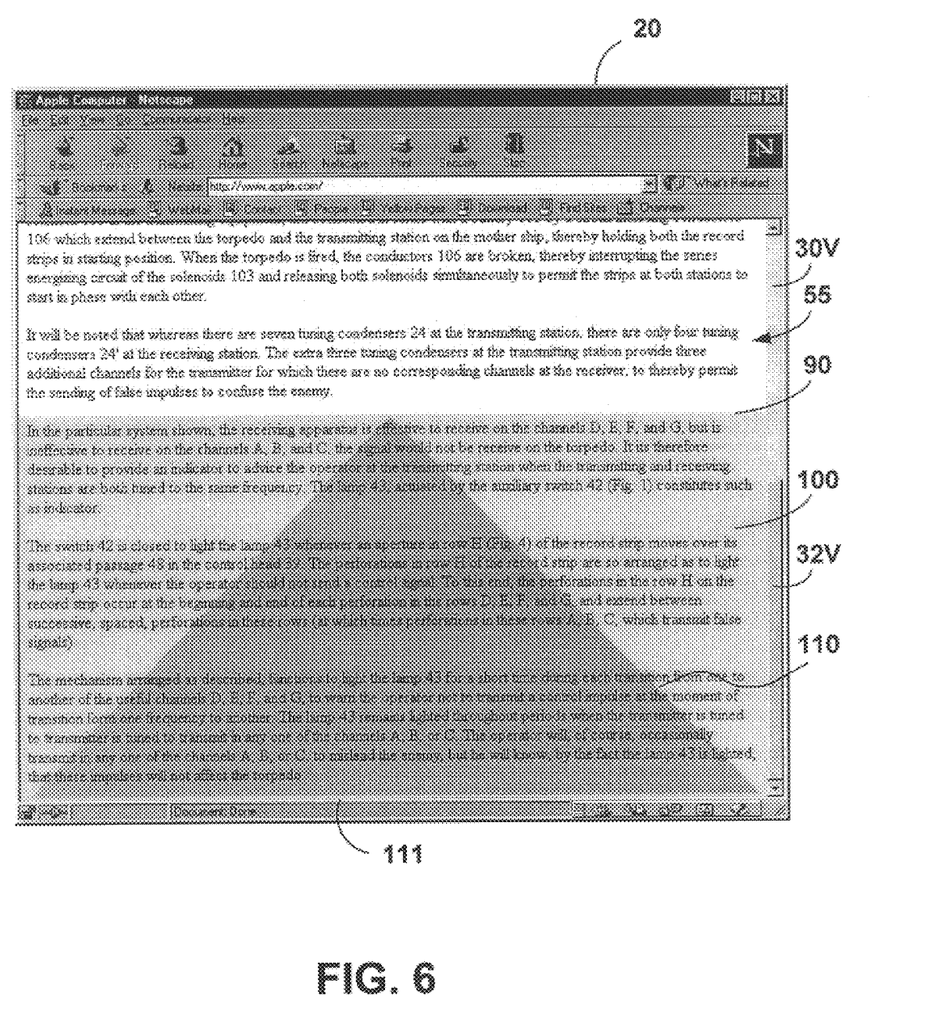
FIG. 6 is a view of an exemplary display screen illustrating one-dimensional visual scrolling feedback according to the present invention.

With reference to FIG. 3, before the user initiates the scrolling operation, the visual feedback layer 44 is clear and does not obstruct the user's view. With reference to FIGS. 4 and 6, as the user scrolls the window 20 from one position to another, such as when scrolling downward, a different region 55 of the document 21 as well as a different feedback layer region 60 of the visual feedback layer 44 become exposed to the user, but remain in an overlapping relationship.

A line 90 delineates the newly exposed region 100 of the document 21. The "old" or previously displayed region 102 of the document 21 remains clear and unobstructed by the visual feedback layer 44. However, the newly exposed region 100 is overlaid with the pattern 110 of the visual feedback layer 44. In the embodiment illustrated in FIGS. 4 and 6, the pattern 110 emerges as a triangle. As scrolling continues in the same direction, the pattern 110 assumes the shape of a diamond (similar to that shown in FIG. 8). As the user scrolls down, the document region 55 scrolls upward. The pattern 110 is repetitive for ease of recognition and association by the user. It should be clear that in other embodiments, the pattern 110 does not need to be repetitive, and that different colors can be used to complement the feedback to the user. In addition, while the present invention will be described in terms of a diamond shaped pattern 110, it should be clear that other shapes, colors, and a combination thereof can alternatively be used. According to another embodiment, as the user scrolls down, the document region 55 scrolls upward and the visible pattern 110 gradually changes its apparent shape. For example, there is a smooth gradation in muting down the page, with the rate of visual change determined by the rate of scrolling. According to still another embodiment, as the user scrolls down, the document region 55 scrolls upward, the visible pattern 110 simultaneously changes its apparent shape and gradation.

The document 21 remains visible during scrolling because the superimposed visible pattern 110 is either semi-transparent or a wireframe. When the user stops scrolling, the transient visual effect overlaying the newly exposed region 100 of the document 21 starts to fade gradually or instantly as the visual feedback layer 44 becomes increasingly transparent and the visible document region 55 becomes more clearly visible (FIG. 3). According to another example, the demarcation line 90 is pattern impressed upon the visual feedback layer 44. According to yet another example, the visual feedback layer 44 does not include a pattern, but rather a semi-transparent color for coloring the newly exposed region of the visible document region 55, between the demarcation line 90 and the bottom edge 111 of the window 20.

Figure 7:
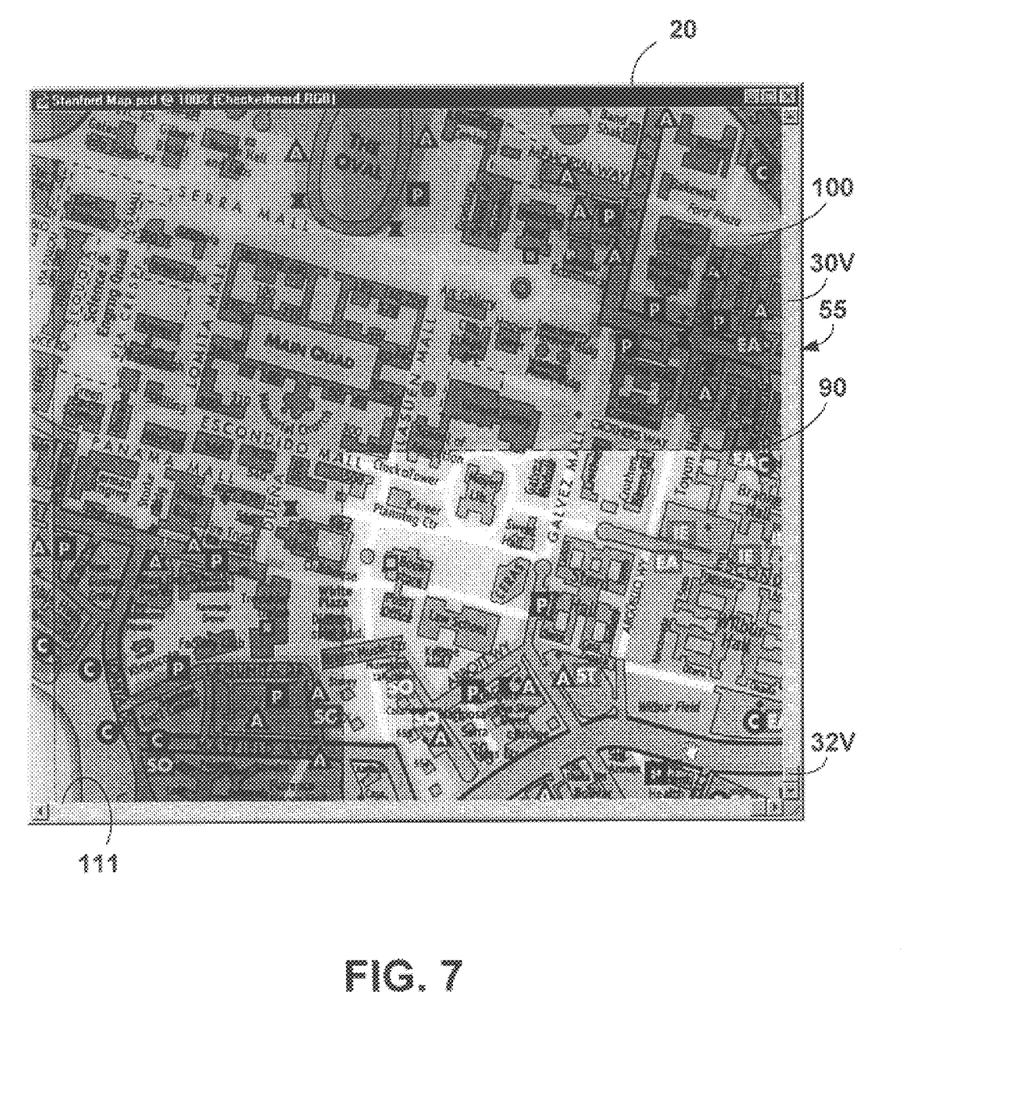
FIG. 7 is a view of an exemplary display screen illustrating two-dimensional visual scrolling feedback according to the present invention.

FIG. 7 illustrates a two-dimensional scrolling technique using a translucent, repeating pattern. In this example, the user can scroll around an image of a map, where the repeating pattern indicates not only the scrolling context but establishes a physical scale and grid, which relates to geographic position and distance. The user performs diagonal scrolling of a map, using a "hand grabber" tool. The user pulls the map image down and to the right, exposing a new section 100 of the map, which is temporarily colored by a checkerboard pattern. The prior area viewed is clear and is not affected by the visual feedback layer visual feedback layer 44, and is further captured within a rectangle in normal color and contrast. The rest of the document region 55 that has been recently exposed, fills the remainder of the window 20 and is overlaid by the visual feedback layer 44. In this example, the visual feedback layer 44 is a muted color that eventually develops to full color, either instantaneously or gradually, when scrolling ends.

Figure 4A:
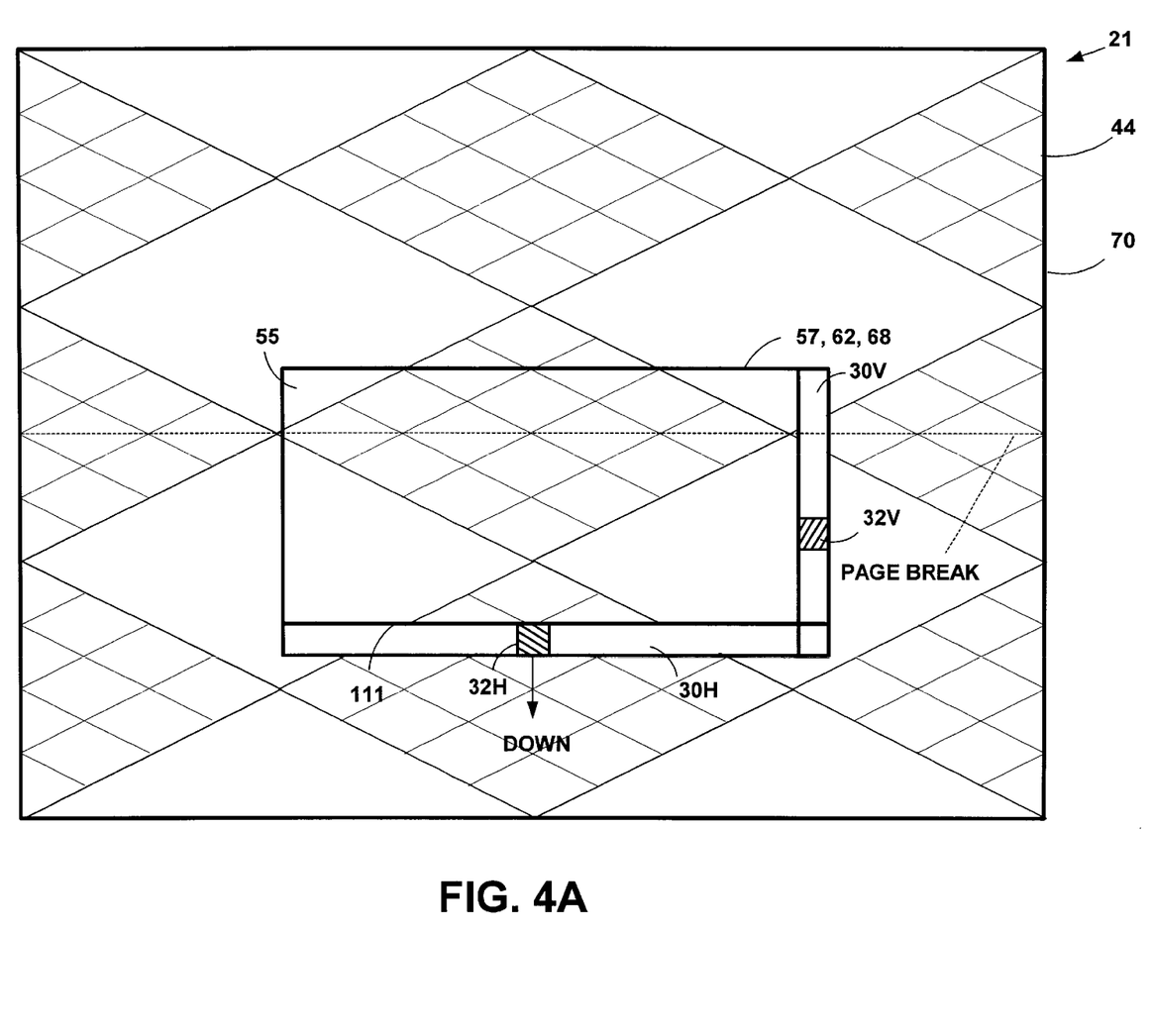

According to another example, such as when scrolling multiple pages (windows worth of space) of a world wide web HTML document, the newly exposed region 55 of the document 21 is covered with a translucent graphical pattern 110. The superimposed pattern 110 coincides with the window length, and each period can be coded with a different color. This gives the user cues or guidance to track how many pages have been reviewed and his or her location in the page, as shown in FIGS. 3, 4A, and 5, which illustrate a translucent repeating pattern of diamonds (for example pink colored) with a period corresponding to a page size (such as a blue background). Once the user stops scrolling, the superimposed graphics fade away in one to three seconds so it does not affect the document reading. The visual feedback layer 44 can also be replaced by patterns that consist of simply lines that do not obscure the content of the document 21. The visual effect may not be as appealing as a colored and patterned background, but the lines require less computation resources.

A useful aspect of the absolute positioning feedback is that each diamond can cover a specific number of lines, for example 100 lines of text, and consequently the user can easily scroll to a specific line number, for example line 50, by graphically scrolling one half the diamond size.

The visual scrolling feedback technique can be totally implemented as a software package, or alternatively, it can be totally implemented or partly complemented in graphic accelerator cards, such as are those commonly used in personal computers (PCs). When the visual scrolling feedback technique is implemented using hardware components, it can provide realtime feedback to the user without imposing excessive overhead on the central processing unit (CPU) or memory bandwidth. A variety of standard or available image processing algorithms can be used to combine the overlay with the image of the source document.

Figure 8:
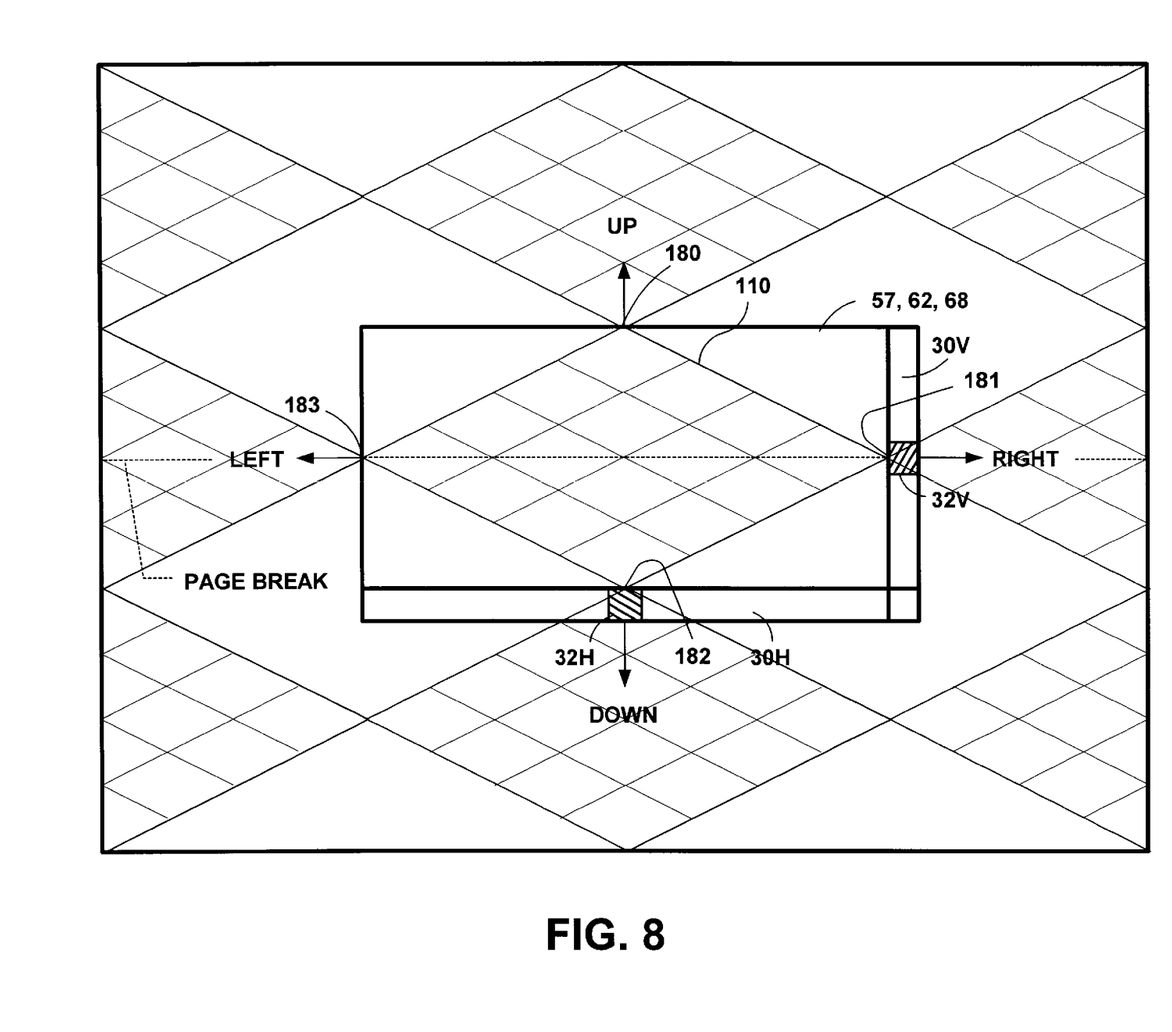
FIGS. 8 and 9 are views of the exemplary implementation of FIG. 2 with the document removed for ease of illustration, showing a relative positioning feedback approach of the present invention.
Figure 9:
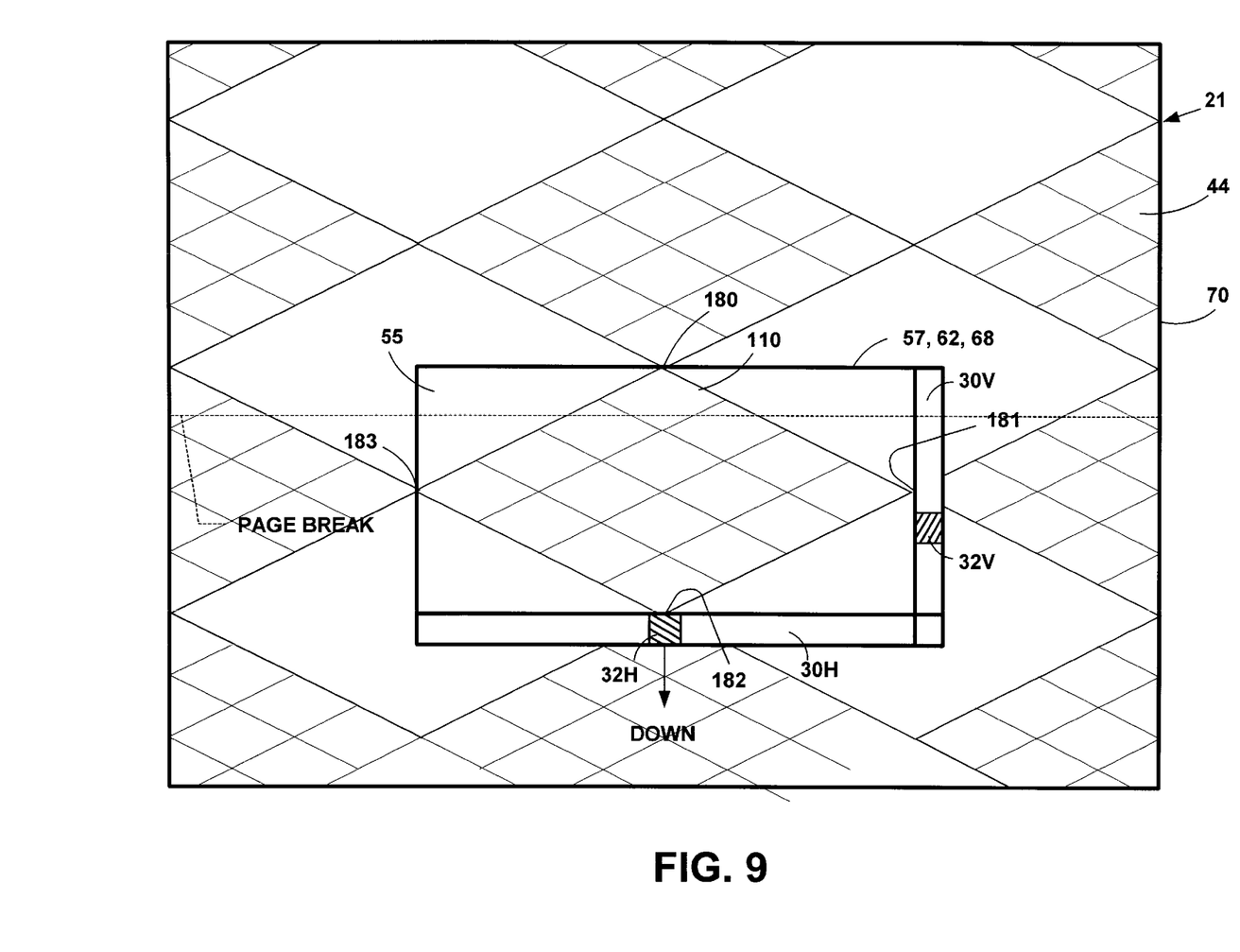

FIGS. 8 and 9 illustrate an example of the relative positioning feedback technique. According to this technique, the visible spatial pattern 110 of the visual feedback layer 44 has discrete size and shape relative to the size and position of the window 20, so that when the window 20 moves, the viewable region 60 of the visual feedback layer 44 remains unchanged to the user. In this example, the user sees a diamond shaped overlay pattern 110 before and after he or she scrolls the window 20. In other terms, the four corners 180, 181, 182, 183 of the diamond shaped pattern 110 maintain their position relative to the sides of the window 20, regardless of the scroll, pan, or zoom position and size of the window 20.

Figure 10:
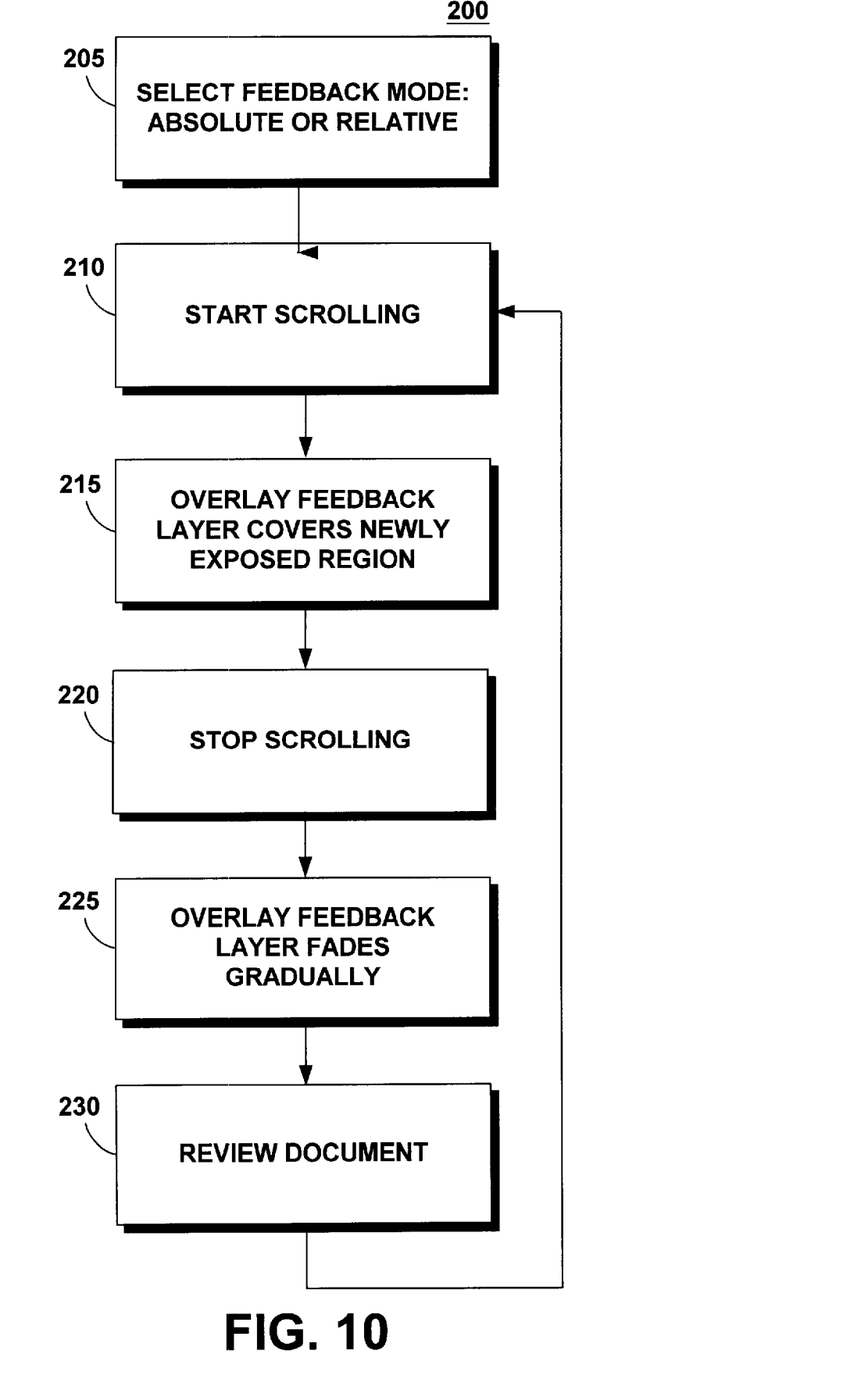
FIG. 10 is a high-level block diagram illustrating the operation of the visual scrolling feedback process of the present invention.

FIG. 10 summarizes the operation of an exemplary visual scrolling feedback process 200 of the present invention. The process 200 is initiated at block 205 by having the user select the desired feedback mode: absolute positioning approach or relative positioning approach. The user starts scrolling at block 210, and the visual feedback layer 44 starts. appearing and overlaying the newly exposed region 55 of the document 21. As soon as scrolling stops at block 220, the visual feedback layer 44 starts to gradually fade until it becomes completely transparent.

This will provide the user with the opportunity to review the document 21 (block 230) with an unobstructed view. As soon as the user resumes the scrolling, panning, or zooming operation, the foregoing process is repeated until terminated by the user. The method 200 can be readily implemented in graphic accelerator cards, such as are commonly found in personal computers, where it can provide realtime feedback to the user without imposing excessive overhead on the CPU or memory bandwidth.

It is to be understood that the specific embodiment of the invention is merely illustrative of specific applications of the principles of the present invention. Numerous modifications may be made to the visual scrolling feedback and associated method described herein without departing from the spirit and scope of the present invention.

What is claimed is:

1. A method of providing visual feedback to a user while scrolling a document through a window, comprising:

overlaying a semi-transparent visual feedback layer on a newly exposed region of the document as scrolling is initiated, for enhancing the user's ability to maintain spatial context while scrolling the document; and causing the visual feedback layer to gradually fade until it becomes transparent to allow for an unobstructed view of the document.

2. The method according to claim 1, further including selecting a feedback mode.

3. The method according to claim 2, wherein selecting the feedback mode includes selecting an absolute positioning approach.

4. The method according to claim 2, wherein selecting the feedback mode includes selecting a relative positioning approach.

5. The method according to claim 1, wherein causing the visual feedback layer to gradually fade occurs when scrolling ceases.

6. The method according to claim 1, wherein causing the visual feedback layer to gradually fade occurs after a predetermined period of time from the cessation of scrolling.

7. The method according to claim 1, wherein the step of overlaying the semi-transparent visual feedback layer on the document resumes if any one or more of the following actions occurs: scrolling, panning or zooming.

8. The method according to claim 1, wherein overlaying the visual feedback layer on the document includes using a graphical overlay.

9. The method according to claim 8, wherein overlaying the visual feedback layer includes compositing the graphical overlay and the document.

10. The method according to claim 9, wherein compositing the graphical overlay and the document includes using any one or more of the following techniques: alpha-blending or image multiplication.

11. The method according to claim 8, wherein overlaying the visual feedback layer includes using a periodic, spatially-repetitive pattern.

12. The method according to claim 8, wherein overlaying the visual feedback layer includes using a periodic, spatially-repetitive color.

13. A method of providing visual feedback to a user while zooming out of a document, comprising:

overlaying a semi-transparent visual feedback layer on a newly exposed region of the document as zooming out is initiated, for enhancing the user's ability to maintain spatial context while zooming the document; and causing the visual feedback layer to gradually fade until it becomes transparent to allow for an unobstructed view of the document.

14. The method according to claim 13, further including selecting a feedback mode from any one of: an absolute positioning approach, or a relative positioning approach.

15. The method according to claim 14, wherein causing the visual feedback layer to gradually fade occurs when zooming ceases.

16. The method according to claim 13, wherein the step of overlaying the semi-transparent visual feedback layer on the document resumes if any one or more of the following actions occurs: zooming, panning or scrolling.

17. The method according to claim 13, wherein overlaying the visual feedback layer includes using a periodic, spatially-repetitive pattern.

18. A method of providing visual feedback to a user while panning a document, comprising:

overlaying a semi-transparent visual feedback layer on a newly exposed region of the document as panning is initiated, for enhancing the user's ability to maintain spatial context while panning the document; and causing the visual feedback layer to gradually fade until it becomes transparent to allow for an unobstructed view of the document.

19. The method according to claim 18, further including selecting a feedback mode from any one of: an absolute positioning approach, or a relative positioning approach;

wherein causing the visual feedback layer to gradually fade occurs when panning ceases; and wherein overlaying the semi-transparent visual feedback layer on the document resumes if any one or more of the following actions occurs: panning, zooming or scrolling.

20. The method according to claim 18, wherein overlaying the visual feedback layer includes using a periodic, spatially-repetitive pattern.

* * * * *